UNITED STATES PATENT OFFICE.

HEINRICH SCHOTT, OF CHARLOTTENBURG, GERMANY, ASSIGNOR TO ACTIEN GESELLSCHAFT FÜR ANILIN FABRIKATION, OF BERLIN, GERMANY.

ORGANIC MERCURY COMPOUND.

1,016,784.      Specification of Letters Patent.      Patented Feb. 6, 1912.

No Drawing.      Application filed May 8, 1911. Serial No. 625,770.

*To all whom it may concern:*

Be it known that I, HEINRICH SCHOTT, a citizen of the German Empire, residing at Charlottenburg, near Berlin, Germany, my post-office address being Eichenallee 35, Charlottenburg, near Berlin, Germany, have invented certain new and useful Improvements in New Organic Mercury Compounds, of which the following is a specification.

Among the great number of organic mercury compounds which are employed for internal or external medicinal purposes and as germicides a special kind of such compounds has become of great importance which contain the mercury bound in such a way that it is not ionized in an aqueous solution of such a compound.

Now my present invention relates to a new class of this kind of mercury compounds which is derived from pyrazolones having, according to the commonly used constitution formula, a free methylene group: $-CH_2-$, and more especially from phenylpyrazolones, such as for instance 1-phenyl-3-methyl-5-pyrazolone, 1-phenyl-3-methyl-5-pyrazolone sulfonic acids, phenyl pyrazolone carboxylic acids, nitro- or aminophenylpyrazolones, phenylpyrazolone-methylamino-omega-carboxylic acids etc. The mercurized bodies of this new series which are soluble in water, for instance those which contain a sulfonic or carboxylic group, are especially suitable for medicinal purposes. Researches as to the question of the germicidal power of these soluble mercury compounds have been very satisfying; for instance it has been found that a mercury compound which is obtained from 1-phenyl-3-methyl-5-pyrazolone-para-sulfonic acid and which contains about 27% of mercury is nearly as germicidal as mercuric chlorid.

In order to obtain my new mercury compounds one may proceed in different ways. For instance a pyrazolone compound having a methylene group: $-CH_2-$, such as for instance 1-phenyl-3-methyl-5-pyrazolone may be dissolved in water with the addition of a caustic alkali and may be brought in reaction with an inorganic or organic mercuric salt or compound, such as for instance mercuric chlorid, mercuric acetate, mercuric oxid, the mercury compounds of alanin, of glycocoll, of acetamid, etc. Of course if a pyrazolone containing a sulfonic group or carboxylic group is acted upon with a mercuric salt in the presence of an excess of an alkali, which excess is bound to the methylene group of the pyrazolone nucleus, a new mercury compound is brought about, but the compound obtained in this way contains also mercury, capable of ionization. Now this difficulty according to my invention may be easily overcome by acting with mercuric oxid upon a salt of such a sulfonic or carboxylic acid, such as for instance an alkali salt. In this way very valuable new mercury compounds can be manufatured.

The following examples may serve to illustrate my invention, the parts being by weight:

1. 17.4 parts of 1-phenyl-3-methyl-5-pyrazolone are dissolved in about 200 parts of water with the addition of 12.5 parts of soda-lye of 40° Baumé specific gravity. The solution thus obtained is added to an aqueous solution of 13.6 parts of mercuric chlorid; it separates at once a thick white precipitate which is isolated by draining, washing with water and drying. The new mercury compound thus obtained melts at about 220° C. and is decomposed when heated above this point. It is very difficultly soluble in water and when acted upon with soda-lye even at the boil no yellow mercuric oxid is formed. The new body is easily soluble in benzene and rather soluble in glacial acetic acid but very difficultly soluble in alcohol and acetone.

If in the foregoing example the proportion of mercuric chlorid is doubled, that is to say if 2 molecular proportions of mercuric chlorid are employed to 2 molecular proportions of the pyrazolone derivative, a new mercury compound is obtained which contains the mercury also in the form not capable of ionization. This product is also very difficultly soluble in water, but easily soluble in benzene and very easily soluble in acetone. On heating it melts at about 190° C.

2. A freshly prepared paste of mercuric oxid which is prepared by dissolving 16.3 parts of mercuric chlorid in water, filtering the aqueous solution into diluted soda-lye and washing carefully the mercuric oxid thus precipitated, is added while heating and agitating to a solution of 15 parts of 1-phenyl-3-methyl-5-pyrazolone in about 200 parts of acetone. The mercuric oxid enters into solution quickly. This point attained, the solution is filtered if necessary, evaporated preferably *in vacuo* and pulverized. Thus is obtained a new mercury compound in the shape of a slightly yellowish powder possessing a high percentage of mercury and from which even on heating for a long time with soda-lye no mercuric oxid is separated. This product is easily soluble in acetone, benzene and glacial acetic acid and rather soluble in alcohol. On heating it melts at about 170° and by further heating it is decomposed. According to these properties it seems that this compound is not identical with that of the Example 1.

3. 51 parts of 1-phenyl-3-methyl-5-pyrazolone-para-sulfonic acid are dissolved in about 500 parts of water with the addition of such a quantity of calcined sodium carbonate that a neutral or weakly alkaline solution is obtained. This solution, after filtering if necessary, is introduced into a freshly prepared paste of mercuric oxid which is prepared by dissolving 27 parts of mercuric chlorid in water, filtering this solution into an excess of dilute soda-lye and washing the mercury oxid with water. This mixture is then heated gently while agitating, the mercuric oxid dissolving within a short time. This point being attained the solution is filtered if necessary and the filtered solution is evaporated using a highly diminished pressure and a low temperature. Thus is obtained the new mercury compound in the shape of a weakly yellow colored powder which is easily soluble in water to a yellow solution, from this solution on the addition of soda-lye no separation of mercuric oxid occurs. On heating the new substance assumes a dark color at about 200° C. and on further heating up to 360° no visible decomposition occurs. This new compound contains about 27% of mercury and according to special researches this new mercury compound has been proved to be nearly as germicidal as mercuric chlorid.

It is obvious to those skilled in the art that my present invention is not limited to the foregoing examples or to the details given therein. For example, instead of 1-phenyl-3-methyl-5-pyrazolone nitro-, amido-, chloro-, bromo- and other derivatives of this phenylpyrazolone derivative and having a so-called free 4-position may be used; likewise for the 1-phenyl-3-methyl-5-pyrazolone-para-sulfonic acid another sulfonic acid, as for instance the meta-sulfonic acid or a chloro-sulfonic acid, such as for instance, ortho-chloro-1-phenyl-3-methyl-5-pyrazolone-meta-sulfonic acid

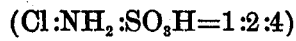
(Cl:NH$_2$:SO$_3$H=1:2:4)

may be substituted. Of course if manufacturing the mercury compounds of such other pyrazolone derivatives the special conditions of reaction may be varied in order to obtain the best results.

The germicidal power of the new mercury compounds as well as their efficiency as internal remedies naturally depend to a certain extent upon the proportion of mercury contained therein; in this respect it is convenient to state that various quantities of mercury can be introduced into the molecule of the respective organic compound by employing different proportions of mercuric chlorid or mercuric oxid or of another mercury compound in respect to the proportion of the organic compound in question.

Finally a number of pyrazolone compounds may be named which are also adapted to the manufacture of my new mercury compounds, namely 1-phenyl-3-methyl-5-pyrazolone-para-methylamino-omega-carboxylic acid, 1-phenyl-3-pyrazolone, 3-phenylpyrazolone, pyrazolone-3-carboxylic acid, 1-phenyl-5-pyrazolone-3-carboxylic acid, 1-phenyl-2-methyl-5-pyrazolone, 1-phenyl-2-methyl-5-pyrazolone-3-methyl-carboxylic acid, 1-phenyl-3-pyrazolone-2-urethane, 1-phenyl-5-methyl-3-pyrazolone, 1.2-diphenyl-3-methylpyrazolone, 1.5-diphenyl-3-pyrazolone, 1-phenyl-5-pyrazolone, etc.

Having now described my invention and the manner in which it may be performed, what I claim is,—

1. The hereinbefore-described process for the manufacture of new organic mercury compounds which consists in acting with a mercury compound on a pyrazolone which, according to the commonly employed constitution formula, contains a methylene group: —CH$_2$—.

2. The hereinbefore-described process for the manufacture of new organic mercury compounds which consists in acting with a mercury compound on a phenylpyrazolone which, according to the commonly employed constitution formula, contains a methylene group: —CH$_2$—.

3. The hereinbefore-described process for the manufacture of new organic mercury compounds which consists in acting with a mercury compound on 1-phenyl-3-methyl-5-pyrazolone-para-sulfonic acid.

4. The hereinbefore-described process for the manufacture of new organic mercury compounds which consists in acting with mercuric oxid on a solution of an alkali salt of 1-phenyl-3-methyl-5-pyrazolone-para-sulfonic acid.

5. The hereinbefore-described process for the manufacture of a new organic mercury compound which consists in acting with the mercuric oxid prepared from 27 parts of mercuric chlorid on an aqueous solution of the normal sodium salt prepared from 51 parts of 1-phenyl-3-methyl-5-pyrazolone-para-sulfonic acid.

6. As new articles of manufacture new organic mercury compounds containing a pyrazolone residue, which pyrazolone residue in the free state, according to the commonly used constitution formula, possesses a methylene group: —$CH_2$—, which new compounds contain the mercury bound in such a way that it is not capable of ionization, and from which compound by the action of caustic alkali no mercuric oxid is separated, but which new compounds by the action of a mineral acid are split up, the mercury being eliminated from the organic residue of the molecule, and these new compounds when heated in a current of coal-gas in mixture with calcium oxid being decomposed so that metallic mercury distils over, and which new mercury compounds show a strong germicidal power and possess a high melting point or point of decomposition.

7. As new articles of manufacture new organic mercury compounds containing a phenylpyrazolone residue, which phenylpyrazolone residue in the free state, according to the commonly used constitution formula, possess a methylene group: —$CH_2$—, which new compounds contain the mercury bound in such a way that it is not capable of ionization, and from which compound by the action of caustic alkali no mercuric oxid is separated, but which new compounds by the action of a mineral acid are split up, the mercury being eliminated from the organic residue of the molecule, and these new compounds when heated in a current of coal-gas in mixture with calcium oxid being decomposed so that metallic mercury distils over, and which new mercury compounds show a strong germicidal power and possess a high melting point or point of decomposition.

8. As new articles of manufacture the new organic mercury compounds containing mercury in association with 1-phenyl-3-methyl-5-pyrazolone-para-sulfonic acid, in which new compounds the mercury is not capable of ionization and from which new mercury compounds by the action of caustic alkali no mercuric oxid is delivered, but which new compounds by the action of a mineral acid are split up, the mercury being eliminated from the organic residue of the molecule, and these new compounds when heated in a current of coal-gas in mixture with calcium oxid being decomposed so that metallic mercury distils over, and which new mercury compounds show a strong germicidal power and possess a high point of decomposition.

9. As a new article of manufacture the new organic mercury compound containing mercury in association with 1-phenyl-3-methyl-5-pyrazolone-para-sulfonic acid and possessing about 27% of mercury, in which new compound the mercury is not capable of ionization, and which new mercury compound in the dry state when pulverized is a weakly yellow colored powder which easily dissolves in water to a yellow solution, from which solution on the addition of soda-lye no separation of mercuric oxid occurs, this new compound having proved to be nearly as germicidal as mercuric chlorid, and this new compound by the action of a mineral acid being split up, the mercury being eliminated from the organic residue of the molecule, and this new compound when heated in a current of coal-gas in mixture with calcium oxid being decomposed so that metallic mercury distils over, and which new mercury compound possesses a high point of decomposition.

In testimony whereof I have hereunto set my hand in presence of two subscribing witnesses.

HEINRICH SCHOTT.

Witnesses:
WOLDEMAR HAUPT,
HENRY HASPER.